Feb. 27, 1951         B. G. RICH ET AL         2,543,200
OIL FILLER AND DRAIN MEANS FOR
INTERNAL-COMBUSTION ENGINES
Filed Dec. 8, 1948
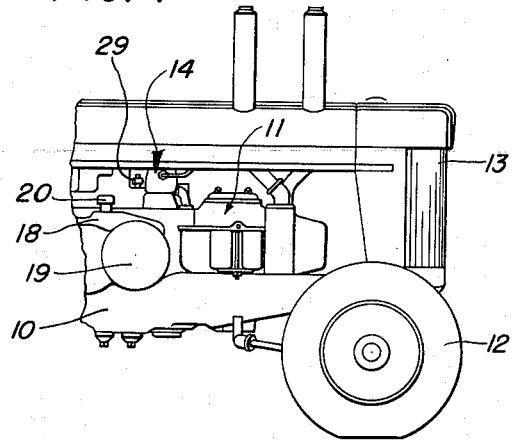
FIG. 1
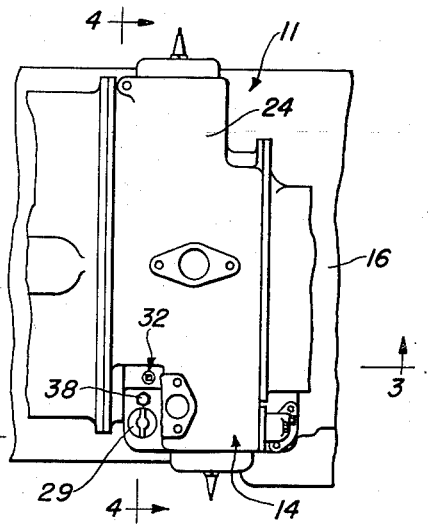
FIG. 2
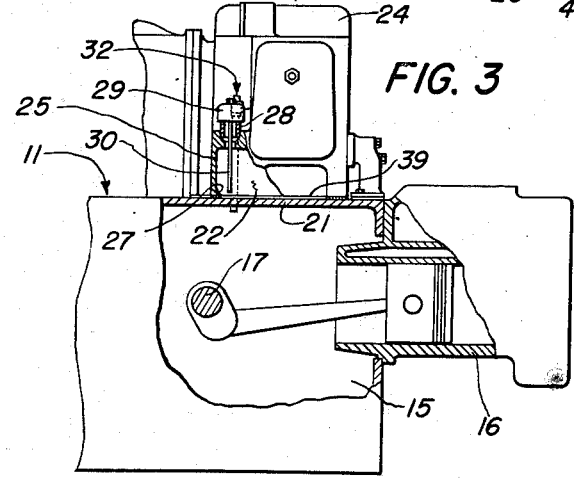
FIG. 3
FIG. 5
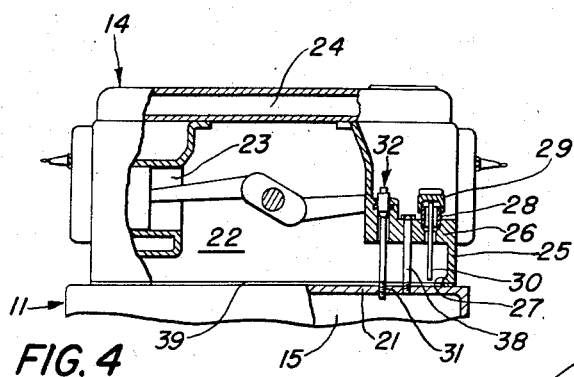
FIG. 4
INVENTOR.
B. G. RICH, J. P. SANDOVAL &
B. G. VALENTINE
BY
ATTORNEYS Patented Feb. 27, 1951

2,543,200

UNITED STATES PATENT OFFICE 2,543,200

OIL FILLER AND DRAIN MEANS FOR INTERNAL-COMBUSTION ENGINES

Barrett G. Rich and John P. Sandoval, Waterloo, Iowa, and Bertram G. Valentine, Kenmore, N. Y., assignors to Deere Manufacturing Co., Dubuque, Iowa, a corporation of Iowa Application December 8, 1948, Serial No. 64,218

14 Claims. (Cl. 60—97)

This invention relates to internal-combustion engine structure and more particularly to lubricant-containing means therefor. Still more particularly, the invention relates to internal-combustion engine structure involving a plurality of engines.

In vehicles or power units equipped with Diesel engines, it is customary in some cases to provide a smaller gasoline engine for starting the Diesel. The two engines are closely associated and ordinarily the gasoline engine is mounted directly upon the Diesel, in some instances being mounted directly upon an upper portion of the Diesel. Since the two engines are primarily independent units, some problems in design are presented in associating the two into a compact organization, particularly in cases in which the two are to be used in a tractor, for example.

According to the present invention, it is a principal object to provide a construction in which the design of the two engines for use together is considerably simplified and to provide primarily the use of a structural part of one engine for a structural part of the other. Specifically, it is an object of the invention to mount the smaller, gasoline engine on the larger, Diesel engine in such manner that a portion of the crankcase of the latter provides a completing portion for the crankcase of the former. In this respect, it is another object of the invention to provide means for supplying lubricant to the crankcase of the gasoline engine and, in addition, to provide means for draining the lubricant from the gasoline engine crankcase into the Diesel engine crankcase. It is a further feature to provide means accessible from the outside of the engines for controlling a communicating passage between the engine crankcases, whereby this passage may be closed to separate the crankcases or opened to permit drainage from one crankcase to the other.

Apart from the use of the two engines in which one provides a portion of the other, it is an object to provide a crankcase or similar chamber having spaced-apart wall portions wherein one is provided with means for draining liquid or lubricant from the chamber and wherein means accessible from outside of the chamber extends through the other wall to control the drain means. In this respect, it is a feature of the invention to provide means including a closure for the drain opening and a closure for the other wall through which the drain-control means extends.

The foregoing and other desirable objects and important features inherent in and encompassed by the invention will become apparent to those versed in the art as a preferred form of the invention is fully disclosed in the following detailed description and the accompanying sheet of drawing in which:

Figure 1 is a side elevational view of the forward portion of a tractor equipped with two internal-combustion engines of the general type referred to;

Figure 2 is a fragmentary plan view, on an enlarged scale, of the gasoline engine and the lubricant filler and drain means;

Figure 3 is a longitudinal sectional view taken substantially along the line 3—3 of Figure 2;

Figure 4 is a transverse sectional view taken substantially along the line 4—4 of Figure 2; and Figure 5 is an enlarged fragmentary sectional view of the closure element and related structure.

The tractor illustrated in the present drawing is merely representative of one installation of associated Diesel and gasoline engines and the disclosure in this respect should therefore be taken as illustrative and not limiting. The tractor is shown as having a main longitudinal body 10 at the forward end of which is located a main power plant, here shown as a Diesel engine, designated generally by the numeral 11. The numeral 12 designates a wheeled axle assembly for carrying the forward end of the tractor and the numeral 13 designates generally a radiator grille and hood assembly. The numeral 14 designates a smaller gasoline or volatile-mixture engine used for starting the Diesel engine but idle when the Diesel engine is operating. The relationship between the two engines for starting purposes may be conventional and the details thereof will not be included here.

As best shown in Figure 3, the Diesel engine is provided with a crankcase 15 from which a cylinder block 16 extends forwardly, the engine being of the type in which a pair of cylinders extends horizontally and longitudinally as respects the principal axis of the tractor body and in which the crankshaft, designated at 17, lies transversely across the body. An example of an engine of this type is shown in the U. S. patent to McCray 1,919,069.

As shown in Figure 1 of the present disclosure, the right side of the body is provided with a casing portion 18 through which the right hand end of the crankshaft extends to carry a combined clutch and belt pulley 19. The details of this arrangement form no part of the present invention but a general description thereof is included for the purpose of completing the basic picture of the tractor.

Lubricant may be introduced or supplied to the crankcase 15 through a filler neck 20 which is normally closed by a removable cap, as is conventional.

The crankcase 15 is provided as a structure made up of a plurality of wall portions, one of which is a top or upper horizontal wall portion 21, forming a chamber for containing or receiving liquid such as lubricant. This top wall 21, in addition to serving as the upper part of the crankcase 15, also serves as a support for the smaller engine 14.

The small engine illustrated here is of the opposed-cylinder type including a central crankcase 22 and oppositely extending cylinders 23. The upper portion of the engine 14 is provided as a manifold 24 which extends transversely over and is connected to the cylinders. Pistons in the cylinders 23 are connected in a conventional manner to a crankshaft.

The crankcase or chamber of the gas engine 14 is provided by a plurality of vertical wall portions 25 and a transverse top or upper horizontal wall portion 26. The wall portions 25 and 26 do not provide a complete chamber or crankcase, inasmuch as the crankcase 22 is open at its bottom, as at 27.

In this respect, it is a feature of the invention to mount the small engine 14 on the Diesel engine 11 in such manner that the top wall 21 of the Diesel engine crankcase 15 completes or forms a bottom enclosure or wall for the gas engine crankcase 22. In other words, the upper portion of the Diesel engine crankcase provides a sump for the gas engine crankcase and enables the latter to receive or contain liquid such as lubricant. Inasmuch as the top wall 21 of the Diesel engine crankcase 15 may be said to be common to both crankcases, it separates the crankcases into two chambers, each of which is adapted to contain its own supply of lubricant and, in the present case, each crankcase is provided with its own means for the introduction of lubricant thereto, the crankcase 15 having the filler 20 and the crankcase 22 having a filler at 28 which is normally closed by a removable cover 29. As shown, the cover or cap 29 is of the type having an oil stick or bayonet gauge 30 thereon. The filler necks 20 and 28 are preferably located at the same side of the tractor for the purposes of convenience and accessibility.

Another feature of the invention resides in the means for draining the lubricant from the upper or small engine crankcase 22. This means is in the from of a passage provided by an opening 31 in the separating wall portion 21. This passage means is controllable to separate the two crankcases or to provide for the transfer of lubricant by gravity from the upper crankcase to the lower crankcase. The control of this passage means is accomplished by a single removable element designated generally by the numeral 32 and comprising a lower closure part 33 and an operating part 34. This element is preferably in the form of a rod in which the lower part 33 is externally threaded to fit within and close the opening 31, which is internally threaded. The upper or top wall 26 of the gas engine is provided with an opening 35 which is substantially coaxially alined vertically with the opening 31 and through which the upper part 34 of the element 32 extends. The element thus extends between the spaced-apart wall portions 21 and 26 and projects upwardly beyond the upper wall 26 to provide means accessible from outside the chambers or crankcases for controlling the passage means between the crankcases. For the purpose of facilitating removal and installation of the element 32, the upper part thereof is squared at 36 and may receive a wrench or similar tool.

The opening 35 around the upper part 34 of the element 32 is provided with seal means in the form of a gasket 37, thus establishing a closure in coöperation with the element 32 for the upper opening. Hence, although the element 32 is accessible from outside of the upper crankcase, it normally closes the crankcase against the entrance of dirt.

The two engines are secured together as by bolts 38, and a gasket 39 completes the lubricant-tight joint between the crankcase 22 and the top wall 21 of the crankcase 15.

The arrangement described above is relatively simple in construction in so far as concerns the design that embodies the relationship between the engines in which one forms a part of the other. The operation of the drain control means is likewise relatively simple, it being necessary only to unscrew the element 32 to provide for the drainage of lubricant from the crankcase 22 to the crankcase 15. This lubricant may be drained from the crankcase 15, along with the lubricant ordinarily therein, by conventional means such as a drain plug (not shown) at the bottom of the Diesel engine crankcase.

Other features of the invention not specifically enumerated above will undoubtedly occur to those versed in the art, as will various modifications and alterations in the preferred form of the invention illustrated, all of which may be accomplished without departing from the spirit and scope of the invention as defined in the appended claims.

What is claimed is:

1. In combination: a first internal-combustion engine having a lubricant-containing crankcase including an upper horizontal wall portion; a second internal-combustion engine having a bottomless crankcase and an upper horizontal wall portion, and mounted on the first engine so that the first engine upper wall portion forms a bottom in the second engine crankcase and the second engine upper wall portion is spaced above the first engine upper wall portion; means in the upper wall portion of the second engine crankcase providing entry for the introduction of lubricant thereto; means including an opening in the upper wall portion of the first engine crankcase to provide for the passage by gravity of lubricant from the second engine crankcase to the first engine crankcase; means operative to selectively open or close the opening; and means providing access through the upper wall portion of the first engine crankcase to said opening and closing means.

2. The invention defined in claim 1, further characterized in that: the opening and closing means comprises a removable plug having an operating portion extending upwardly through an opening in the second engine upper wall portion which is substantially vertically aligned with the opening in the first engine upper wall portion.

3. The invention defined in claim 2, further characterized in that: means is provided for sealing the opening in the second engine upper wall portion around the operating portion of the plug.

4. In combination: a first internal-combustion engine having structure including wall portions providing a liquid-receiving chamber; a second internal-combustion engine adjacent the first engine and having structure including wall portions providing an incomplete chamber adapted to receive liquid and arranged with respect to the first engine structure so that a wall portion of the first engine structure overlies the incomplete portion of the second engine chamber to complete and enable the second engine chamber to contain liquid; means providing a liquid-conveying passage in said first engine wall portion to provide for the passage of liquid from one chamber to the other; means cooperative with the passage and operative selectively to open or close the passage; means connected to said opening and closing means and positioned and arranged for access thereto from outside of the chambers; and means providing entry to one of the chambers for the introduction of liquid thereto from the outside thereof.

5. In combination: a pair of internal-combustion engines, each having wall portions providing a liquid-receiving chamber, and arranged so that the chambers are separate and one chamber has a portion higher than a portion of the other; means providing entry to the chamber having the higher portion, for the introduction of liquid thereto; means providing a liquid-conveying passage from the higher chamber portion to the lower chamber portion; means operative selectively to open or close the passage; and means providing access to said opening and closing means from the outside of the chamber portions.

6. In combination: a pair of internal-combustion engines, each having wall portions providing a liquid-receiving chamber, and arranged so that the chambers are proximate but separated by certain of the wall portions common to both chambers; means providing entry to one of the chambers for the introduction of liquid thereto; means providing a liquid-conveying passage through said common wall portion to communicate one chamber with the other; means operative selectively to open or close the passage; and means providing access to the opening and closing means from the outside of the chambers.

7. In combination: a first internal-combustion engine having a lubricant-containing reservoir; a second internal-combustion engine adjacent to the first engine and having a lubricant-containing reservoir including a portion disposed at a level higher than a portion of the first engine reservoir; means providing a wall portion separating one reservoir portion from the other; means providing a passage in said wall portion for the transfer of lubricant by gravity from the higher reservoir portion to the lower; means operative to selectively open or close said passage; means providing access to the opening and closing means from outside of the reservoirs; and means providing entry to the second engine reservoir for the introduction of lubricant thereto.

8. In combination: a first internal-combustion engine having a crankcase; a second internal-combustion engine mounted on the first engine and having a crankcase at a level higher than the crankcase of the first engine; and drain means communicating between the crankcases for draining lubricant from the second engine crankcase to the first engine crankcase.

9. In combination: a first internal-combustion engine having a crankcase including an upper horizontal wall portion; and a second internal-combustion engine having wall portions forming a crankcase open at its bottom but mounted on the first engine crankcase so that the upper wall portion of the first engine crankcase forms a lubricant-tight closure for the bottom of the second engine crankcase.

10. In combination: a pair of internal-combustion engines arranged one adjacent to the other; means including wall portions forming a crankcase for one engine; and means including certain of said wall portions and other and additional wall portions forming a crankcase for the other engine.

11. In combination: a first internal-combustion engine having wall portions providing a substantially closed casing for containing liquid; a second internal-combustion engine having wall portions providing an incompletely closed casing for containing liquid; said engines being associated so that a wall portion of the first engine casing overlies the incomplete portion of the second engine casing to effectuate the liquid-containing ability of the second engine casing and to separate one casing from the other.

12. In combination: a first internal-combustion engine having a crankcase; a second internal-combustion engine mounted on the first engine and having a crankcase; and means on the first engine separating the crankcases and connected to the second engine crankcase and constructed and arranged to hold lubricant and providing at least part of a lubricant sump for the second engine crankcase.

13. In an internal-combustion engine having a crankcase including upper and lower spaced apart wall portions; means providing a pair of coaxial openings, one in each of said wall portions and the lower opening being threaded; and a single removable means accessible from outside the crankcase and extending through the upper wall portion and to the lower wall portion, having a lower threaded part closing the lower opening and an upper part extending through the upper opening, and seal means cooperative between the upper part of the removable means and the upper wall portion for sealing the upper opening around said removable means.

14. In an internal-combustion engine having a crankcase adapted to contain lubricant and including spaced apart wall portions, one lower than the other; means providing a lubricant drain opening in the lower wall portion; means providing an opening in the other wall portion; and a removable element having a drain closure part rotatably interlockable with the lower wall portion and an operating part drivingly connected to said drain closure part and extending through the other opening and having outside the crankcase a portion formed to receive a tool for rotating the element.

BARRETT G. RICH.
JOHN P. SANDOVAL.
BERTRAM G. VALENTINE.

REFERENCES CITED

The following references are of record in the file of this patent:

UNITED STATES PATENTS

| Number | Name | Date |
| --- | --- | --- |
| 1,515,064 | Miller | Nov. 11, 1924 |
| 2,389,685 | Pike | Nov. 27, 1945 |